United States Patent [19]

Ashmead

[11] 4,216,143

[45] Aug. 5, 1980

[54] SOLUBLE NON-FERROUS METAL PROTEINATES

[76] Inventor: Harvey H. Ashmead, P.O. Box 750, Clearfield, Utah 84015

[21] Appl. No.: 843,969

[22] Filed: Oct. 20, 1977

[51] Int. Cl.$^2$ .............................................. C07G 7/04
[52] U.S. Cl. ...................................... 260/113; 71/15; 71/23; 71/27; 260/112.5 R; 260/429 J; 424/177; 426/656; 562/553; 562/567
[58] Field of Search ............... 260/112 R, 113, 429 J, 260/112.5 R; 562/553, 567

[56] References Cited

U.S. PATENT DOCUMENTS

| | | | |
|---|---|---|---|
| 3,396,104 | 8/1968 | Miller | 210/54 |
| 3,637,640 | 1/1972 | Huber | 260/115 |
| 3,773,929 | 11/1973 | Huber et al. | 260/113 X |
| 3,775,132 | 11/1973 | Richards | 260/112 RX |
| 3,832,338 | 8/1974 | Huber et al. | 260/113 |
| 3,969,540 | 7/1976 | Jensen | 426/657 |
| 4,020,158 | 4/1977 | Ashmead et al. | 424/177 |
| 4,066,405 | 1/1978 | Henkin | 260/113 |

FOREIGN PATENT DOCUMENTS 536682  2/1957  Canada ..................................... 260/113

Primary Examiner—Walter C. Danison
Attorney, Agent, or Firm—Criddle & Western

[57] ABSTRACT

Non-ferrous metal proteinates or chelates of essential bivalent metals with hydrolyzed protein are rendered soluble without destroying the chelate and are more readily assimilated by plants and animals.

5 Claims, No Drawings

SOLUBLE NON-FERROUS METAL PROTEINATES

BACKGROUND OF THE INVENTION

Metal amino acid or protein hydrolysate chelates have been referred to in the art as being water insoluble metal proteinates containing at least two ligands per metal ion present. They are described as such in U.S. Pat. Nos. 4,020,158; 3,969,540; 3,775,132, and 3,396,104.

The proteinate is formed by complexing a protein hydrolysate having protons removed therefrom by pH adjustment until the hydrolysate molecule is electronegative. The electron rich hydrolysate is then reacted with a bivalent metal ion to form a "claw-like" structure known as a chelate.

The chelate is formed by first dissolving a water soluble metal salt in water. The metal ion will have a valence of plus two or more but that does not define all of the reaction sites of the ion. The ion will contain a certain but varying number of waters of hydration known as coordination complexes that may be represented by the following formula using a zinc ion and four waters of hydration.

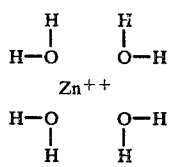

Using glycine as the simplist protein hydrolysate it will exist as a zwitter ion at its isoelectric point and have the formula:

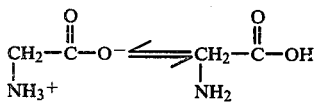

Upon raising the pH, the protons are removed leaving an electronegative hydrolysate or the formula:

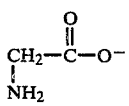

By combining the electronegative protein hydrolysate with a metal ion the following reaction is thought to initially occur:

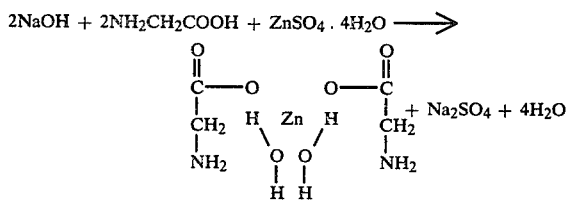

Upon the addition of more base (NaOH) the product becomes a chelate having the formula

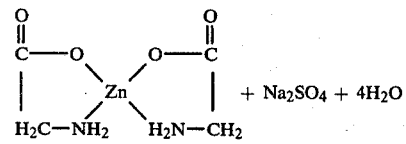

It will be noted that the zinc is completely protected from ionization. Metal proteinates have relatively high stability constants on the order of $10^{7-12}$. The citrates and ascorbates form much weaker chelate bonds on the order of $10^{2-4}$ and EDTA (ethylenediaminetetraacetic acid) and its derivatives form a strong chelate having a stability constant on the order of $10^{16-28}$. The citrates and ascorbates tend to decompose before they can be assimilated into a biological system and it is much more difficult to absorb a positive metal ion than a chelate. EDTA and its derivatives form such strong chelate bonds that they pass intact through most biological systems whether they be plants or animals, including humans. For this reason EDTA is often administered as a metal scavenger to remove unwanted metal ions from biological systems. Metal proteinates are sufficiently stable that they are abosrbed into biological systems whether they be plants or animals, including humans. For this reason EDTA is often administered as a metal scavenger to remove unwanted metal ions from biological systems. Metal proteinates are sufficiently stable that they are absorbed into biological systems where the chelate bonding is broken and the metal ion and amino acid are utilized by the biological system at the appropriate place. In an animal for example, most metal absorption occurs in the small intestine. The metal proteinate then must be sufficiently stable to pass through the acidic stomach media into the small intestine.

In the past, metal proteinates have been insoluble and have been mixed with food or administered in tablet or capsule form. This may not be convenient when using them for plants and animals including man.

DESCRIPTION OF THE INVENTION

It has now been found that metal proteinates selected from the group consisting of zinc, copper, manganese, magnesium and calcium proteinates may be made in soluble form. These metal proteinates are true chelates but are of a different type from the chelates previously described.

Water soluble metal proteinates are unexpected in view of the prior art and are valuable in that they permit the dispensing of these proteinates by more convenient methods. For example soluble metal proteinates may be used as foliar sprays where they are absorbed directly into the leaf of a plant. They may also be applied to the soil or used for seed treatment. When used for humans and other species of the animal kingdom the soluble metal proteinates can be added to drinking water or syrups. The soluble proteinates may also be incorporated into foodstuffs before, during, or after the food has been prepared. However utilized soluble metal proteinates greatly increase the absorption of metals into both plant and animal tissues.

These metals forming the metal proteinates may be from 70–80 percent chelated as determined by analysis. These chelates may contain from about 5–15 percent by weight metal. Usually the metal content will be between 5 and 10 percent by weight. The metal chelates are sufficiently soluble that a solution containing 30 to 40 percent solids may be obtained. As stated, 5-10 percent of the solids will usually be metal with the remainder being protein hydrolysate.

The metal proteinates formed as hereinafter described will largely remain in solution indefinitely which is contrary to the soluble iron proteinate described and claimed in copending application Ser. No. 843,972, filed Oct. 20, 1977.

If desired a solution containing these metal proteinates may be dried and subsequentially reconstituted or dissolved. Thus, the soluble product may be shipped dry thereby avoiding greater freight charges caused by transporting solutions.

The metal ion will contain from two to four ligands regardless of its oxidation state. The pH of the reaction solution must be carefully controlled. At an acidic pH i.e. below about 7, only a salt will be formed. If the pH is too alkaline, i.e. from about about 8, the proteinate will precipitate. Inorganic salts will not function in preparing these metal proteinates. At present only the acetate salts of the desired metals have been found useful. The reaction must be carefully carried out because at the pH utilized the acetate ion has almost as strong an affinity as the ligands for the metal ion. The reaction is thought to produce a chelate having one of the following formulae utilizing glycine as the ligand and zinc as illustrative of the metal.

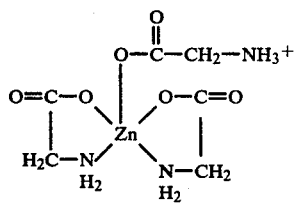

(1)

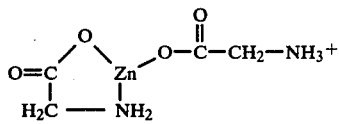

(2)

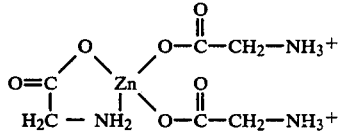

(3)

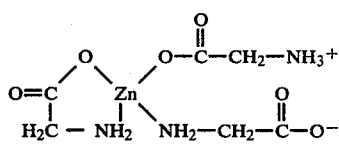

(4)

It will be noted that in each structure illustrated the metal atom is completely neutralized carrying no net charge. This is very important since metal ions are often repelled in a biological system. For example, the magnesium in magnesium sulfate (Epsom Salts) is not readily absorbed by humans and animals and has a laxative effect caused by water entering into the small intestine to flush the unabsorbed magnesium ions out. Magnesium proteinates on the other hand are easily absorbed.

The soluble metal proteinates must be maintained within the proper pH limits but will remain soluble indefinitely if kept between a pH of about 7 and 8. At a pH of much below 7 the product will remain soluble but will be either an acetate salt or a salt formed from a ligand which has reacted with the metal ion but wherein no heterocyclic ring has been formed. At a pH of above about 8 the excess proton shown in the above structures will be removed and the proteinate will precipitate.

While the metal must be used in the form of a metal proteinate any suitable protein hydrolysate may be utilized. Isolated soy protein, albumin, gelatin, casein or any other product capable of producing polypeptides, piptides and naturally occuring animo acids may be used. Such natural amino acids include alanine, arginine, aspartic acid, cystine, diiodotyrosine, glutamic acid, glycine, histidine, hydroxyproline, isoleucine, leucine, lysine, methionine, phenylalanine, proline, serine, threonine, thyroxine, tryptophan, tyrosine, valine, aspartamine and glutamine.

A peptide or polypeptide may be made from a combination of two or more, like or different amino acids and may have a configuration ranging from two glycine molecules up to polypeptide chains having molecular weights in the thousands or hundreds of thousands. The stereo configuration will determine the structure formed. In general, the shorter the chain length of the ligand, the more soluble the proteinate will be.

The metal proteinates will be more readily absorbed in liquid form than as a precipitate.

In order to maintain the pH within the soluble range a buffer system may be used.

The dosage of soluble metal proteinate that may be utilized according to this invention will vary greatly depending upon the metal being used and the plant or animal being treated. For example the recommended daily allowance (RDA) for men is 1000 mg or 1 gram of calcium whereas no limit has been established for certain trace metals known to be essential to the body. When administered to man the dosage may vary from 0.001 to 1.0 grams of metal per day in the form of a proteinate in single or divided dosages. When given to animals, the dosage may vary from 0.001 to 15 mg of metal in the form of a soluble proteinate per kg of body weight per day. When applied to plants, preferably as a foliar spray, the amount of metal may range from about 0.01 to 4 pounds of metal as soluble proteinate per acre per application. The rate of applications and number of applications per growing season will vary according to the plant being treated and the metal being used. The invention, however, does not reside in the proper dosage to use but, rather, in the fact that the metal may be employed in the form of a soluble proteinate.

The following examples are illustrative of the invention only and are not to be construed as limitations thereof.

EXAMPLE 1

To 100 mls of distilled water was added 21.9 grams (0.1 mole) of zinc acetate [$Zn(O_2CCH_3)_2 \cdot 2H_2O$] and 61 grams (0.3 moles of amino acids) of hydrolyzed vegetable protein and 5.6 grams (0.1 mole) of KOH. The pH of the solution was about 7.6. The solution was heated and stirred at about 70°-80° C. for about thirty minutes. After cooling the mixture was found to contain a soluble zinc amino acid chelate.

EXAMPLE 2

The procedure of Example 1 was followed using 24.7 grams (0.1 mole) of manganese acetate [$Mn(O_2CH_3)_2 \cdot 4H_2O$], 61 grams (0.3 moles) of hydrolyzed vegetable protein and 5.6 grams of KOH. The resulting product was a soluble manganese proteinate or amino acid chelate.

EXAMPLE 3

The recommended daily allowance of magnesium, copper and zinc for an adult human being is 400 mg, 2 mg, and 15 mg, respectively. A group of ten adult human volunteers was divided equally into two groups. At the beginning of the test a sample of hair, blood, urine and saliva was taken from each subject and analyzed for magnesium, copper, and zinc content. Five persons took the RDA of magnesium, copper and zinc in the form of commercially available inorganic salt tablets for a thirty day period. The other five subjects took the RDA of magnesium, copper and zinc in the form of soluble metal proteinates dissolved in a fruit drink over the same period of time. At the end of thirty days, a sample of hair, blood, urine, and saliva was again taken from each subject. The results of the tests were averaged together and showed that the magnesium, copper and zinc contents of the group treated with the soluble metal proteinates were 15, 11, and 8 percent higher respectively, than in the control group taking inorganic metal salts.

EXAMPLE 4

A herd of 36 steers of comparable age and weight was divided into two equal groups and housed in similar pens and given the same diets with the exception of the administration of zinc and copper metals. The control group was administered soluble salts dissolved in drinking water calculated to deliver a dosage of 0.15 mg of zinc and 0.02 mg of copper per kg of body weight each day based on average water consumption. The zinc was added as zinc acetate and the copper as copper sulfate. The treated group was given the same amount of zinc and copper in the form of soluble metal proteinates. A hair sample from the neck of each steer was taken at the beginning of the test and again at the end of the test 45 days later. The zinc and copper in the hair of the treated group was 12 and 7 percent higher than at the beginning of the test whereas the hair in the control group showed no significant change.

EXAMPLE 5

Soluble zinc proteinates as a foliar spray were applied to wheat as follows. Five pounds of hard red wheat was rinsed with distilled water three times to remove external contaminates. The wheat was soaked twelve hours in distilled water. The wheat was then placed in six trays with automatic watering. Distilled water was again used.

After ten days the wheat had sprouted to about five inches in height. Tray No. 3 was designated as the control. All other trays were sprayed with a zinc proteinate solution. Ten cc of zinc proteinate would calculate to one pound of zinc as the zinc proteinate diluted to 200 gallons of water and sprayed on one acre. Twenty cc would be equivalent to two pounds per acre of zinc as a zinc proteinate. One to two pounds of zinc per acre is considered to be optimum. One day later one half of each tray was removed and the remaining half was sprayed with the same amount of zinc as used on the entire tray on day ten. On the twelfth day the plants were washed, dried and assayed for zinc content with the results being reported on terms of mgs. of zinc per gram of dried plant.

| Run No. | Day | Tray No. | Volume Spray Used | Zinc mg/gm Leaves | Zinc mg/gm Roots |
|---|---|---|---|---|---|
| 1 | 10 | 3 | 10 cc $H_2O$ | 1.65 | 1.78 |
| 2 | 10 | 1 | 10 cc Zn Proteinate | 2.99 | 1.43 |
| 3 | 10 | 2 | 20 cc Zn Proteinate | 1.93 | 2.62 |
| 4 | 11 | 1 | 10 cc Zn Proteinate | 1.58 | — |
| 5 | 11 | 2 | 20 cc Zn Proteinate | 2.46 | — |

The rate of zinc adsorption into the wheat sprouts is superior to the control in most instances. The results reported in Run No. 4 are in conflict with all other test results and are thought to be based on incorrect data. The results obtained also indicate that application at the rate of 1 lb. per acre of zinc is as good as 2 lbs. per acre; however, more data is being obtained in this regard. In another test it has been shown that zinc proteinate applied at the rate of 2 lbs. of zinc per acre nearly doubled the rate of absorption over application at the rate of 1 lb. per acre.

The above examples are illustrative only and are not to be considered as limitations of the present invention.

I claim:

1. A metal proteinate wherein the metal is selected from the group consisting of zinc, copper, manganese, magnesium and calcium or mixtures thereof having a water solubility sufficient to provide an aqueous solution containing at least five percent by weight metal at ambient temperature at a pH of between about 7 and 8 comprising a metal ion in coordination complex with at least two protein hydrolysate ligands selected from the group consisting of polypeptides, peptides and naturally occurring amino acids wherein at least one of the ligands contains an amino group having an excess proton.

2. A soluble metal proteinate according to claim 1 wherein the metal is zinc.

3. A soluble metal proteinate according to claim 1 wherein the metal is copper.

4. A soluble metal proteinate according to claim 1 wherein the metal is manganese.

5. A soluble metal proteinate according to claim 1 wherein the metal is magnesium.

* * * * *